US008950977B2

(12) United States Patent
Cruickshank

(10) Patent No.: US 8,950,977 B2
(45) Date of Patent: Feb. 10, 2015

(54) ABANDONMENT AND RECOVERY OF PIPELINES

(75) Inventor: John Duncan Cruickshank, Kincardineshire (GB)

(73) Assignee: Subsea 7 Contracting (UK) Limited, Westhill (GB)

( * ) Notice: Subject to any disclaimer, the term of this patent is extended or adjusted under 35 U.S.C. 154(b) by 224 days.

(21) Appl. No.: 13/521,735

(22) PCT Filed: Jan. 10, 2011

(86) PCT No.: PCT/GB2011/050028
§ 371 (c)(1),
(2), (4) Date: Dec. 10, 2012

(87) PCT Pub. No.: WO2011/083340
PCT Pub. Date: Jul. 14, 2011

(65) Prior Publication Data
US 2013/0115007 A1 May 9, 2013

(30) Foreign Application Priority Data
Jan. 11, 2010 (GB) .................................. 1000357.2

(51) Int. Cl.
*F16L 1/19* (2006.01)
*F16L 1/16* (2006.01)
*F16L 1/20* (2006.01)
*F16L 1/26* (2006.01)

(52) U.S. Cl.
CPC . *F16L 1/19* (2013.01); *F16L 1/166* (2013.01); *F16L 1/207* (2013.01); *F16L 1/26* (2013.01)
USPC ......... 405/166; 405/158; 405/173; 405/184.4

(58) Field of Classification Search
CPC ............ B66C 1/12; F16L 1/207; E21B 19/16
USPC ...... 405/154.1, 156–158, 166, 167, 405/168.1–168.4, 170, 173, 184.4, 184.5; 294/66.1, 74; 138/109, 155, 120; 285/45, 48, 53, 145.4, 235, 360
See application file for complete search history.

(56) References Cited

U.S. PATENT DOCUMENTS

| 4,093,292 A | * | 6/1978 | Marcet et al. .................. 294/74 |
| 6,729,802 B2 | | 5/2004 | Giovannini et al. |
| 7,507,055 B2 | | 3/2009 | Smith et al. |

FOREIGN PATENT DOCUMENTS

| EP | 1850043 A2 | 10/2007 |
| GB | 2073361 A | 10/1981 |
| GB | 2335448 A | 9/1999 |
| GB | 2434627 A | 8/2007 |
| WO | WO 2005/005874 A1 | 1/2005 |
| WO | WO 2009/145607 A1 | 12/2009 |

* cited by examiner

*Primary Examiner* — Benjamin Fiorello
*Assistant Examiner* — Carib Oquendo
(74) *Attorney, Agent, or Firm* — Levy & Grandinetti

(57) ABSTRACT

An elongate sling section is disclosed. The elongate sling is cooperable with like sling sections to form a sling for use in abandonment or recovery of a pipeline. The sling section includes end-pieces at five opposite ends and complementary connector formations associated with each respective end-piece. Each connector formation is cooperable, in use when forming a sling, with a complementary connector formation of a neighbouring sling section in the sling. The sling section further includes a tensile load-bearing sling element extending between the end-pieces and a sleeve around the sling element.

25 Claims, 12 Drawing Sheets

ABANDONMENT AND RECOVERY OF PIPELINES

CROSS-REFERENCE TO RELATED APPLICATIONS

This Application is the U.S. National Phase of International Application Number PCT/GB2011/050028 filed on Jan. 10, 2011, which claims priority to Great Britain Application Number 1000357.2 filed on Jan. 11, 2010.

BACKGROUND OF THE INVENTION (1) Field of the Invention

This invention relates to abandonment and recovery or 'A&R' procedures used in marine pipelaying, in which a floating vessel such as a barge is used to lay an offshore pipeline.

The invention has particularly advantages when used with J-lay pipelaying equipment and it will be described in that context, but it is not necessarily limited to J-lay applications.

The J-lay technique is suitable for pipelaying in deep water. It involves welding together successive pipe sections or 'joints' in an upright orientation in a J-lay tower on a pipelaying vessel. The resulting pipe string is launched downwardly into the water as it is formed. The pipe string adopts a single bend as it nears the seabed to lend a J-shape to the pipe string extending between the vessel and the seabed—hence 'J-lay'.

J-lay is necessary in deep water because the pipe string with attached accessories extending from the pipelaying vessel to the seabed is extremely heavy, typically weighing hundreds of tonnes. To avoid buckling, the pipe string must bear that weight in tension, suspended from a holding device on the J-lay tower.

(2) Description of Related Art

An example of a J-lay pipelaying vessel is the Applicant's derrick lay barge Acergy Polaris. The operation of Acergy Polaris during pipelaying will now be outlined with reference to FIGS. 1 and 2 of the drawings. It should be noted that this example is given simply to put the invention into context and so does not limit the scope of the invention. In those drawings:

FIG. 1 is a side view of a J-Lay tower on a barge; and

FIG. 2 is a perspective view of an erector arm loading a double joint into the tower of FIG. 1.

Referring to FIGS. 1 and 2, the J-lay tower 10 of the barge 12 is supplied with double joints 14 of pipe made onshore, which are stored horizontally on the deck 16. As required, the double joints 14 are lifted successively in horizontal orientation from the deck 16 to a tower entry level 18 using a pipe elevator system 20 best shown in FIG. 2. Here, a double joint 14 is loaded into a pivoting erector arm 22, which upends the double joint 14 into an upright orientation and passes it over to a tower handling system comprising a tensioner 24. The double joint 14 is then lowered and aligned with the pipeline end held in a support bushing at a work station 26 on the tower 10.

The double joint 14 is welded to the pipeline end at the work station 26 before the load of the pipe string is transferred from the support bushing to the tensioner 24 near the top of the J-lay tower 10. The completed pipe string is then lowered down to the support bushing for the addition of the next double joint 14. The tensioner 24 and the support bushing alternate to grip the pipeline end, interacting in a so-called 'hand-over-hand' manner.

'Abandonment and recovery' refers to the procedures of laying down and retrieving a pipeline end from the seabed. Those procedures are necessary during normal pipelaying start-up and termination. They are also necessary whenever pipelaying must be interrupted and resumed. For example, the pipelaying vessel may suffer a critical breakdown. More commonly, pipelaying is interrupted due to deteriorating weather conditions, which may stress the pipeline and reduce its fatigue life as the pipelaying vessel rolls and pitches in a rough sea or if it has difficulty remaining in position due to winds and currents. In such cases, the pipelaying vessel may need to abandon the pipeline end and leave the work area. When the problem that caused abandonment has passed, the vessel will return later to recover the pipeline end and resume pipelaying.

Abandonment involves attaching a cap to the pipeline end, typically a pipeline end terminal or 'PLET'. A shackle is attached to a hook on the PLET to secure a wire running through a winch on the pipelaying vessel, and tension is transferred from the tensioner of the J-lay tower to the winch. The winch then lowers the PLET into the sea until the pipeline and PLET rest on the seabed. The wire is then detached from the hook of the PLET, for example using a remote-controlled linkage or an ROV, and is retracted by the vessel for storage.

A recovery buoy is attached to the PLET during abandonment, enabling the PLET and the pipeline end to be located and retrieved during a subsequent recovery procedure. In essence, the recovery procedure is the reverse of abandonment as the wire is reattached to the PLET, typically using an ROV, and the PLET with the attached pipeline end is winched back up to the pipelaying vessel for pipelaying to resume.

It may be possible in some situations for the pipelaying vessel to remain on station above the abandoned pipeline, for example while riding out a period of bad weather. In that case, the wire may be kept attached to the PLET resting on the seabed until the bad weather has passed. This eases the recovery procedure considerably.

Traction (capstan) winches are generally used in A&R procedures to handle the high top tensions characteristic of deep-water pipelaying. Such winches require a continuous length of wire, generally of steel. That wire must be of large diameter—typically 70 mm to 120 mm—to support the great weight of the pipe string that extends above the seabed as the pipeline end nears the surface. Obviously, the wire must also be very long: generally several thousand meters long. Consequently, the wire itself may weigh in excess of 300 tonnes, and it takes up a great deal of space on the vessel when not in use. It also requires a large, powerful and hence expensive winch.

Until recently, it was not possible to manufacture continuous lengths of wire of the necessary diameter. Indeed, A&R wires remain a high-cost item. They are also susceptible to damage, particularly in the corrosive marine environment, and so have a limited life. If damaged, the whole wire may have to be down-rated or rejected; this makes it advisable for the pipelaying vessel to carry a spare wire but this, of course, doubles the problems of high cost and storage space.

Multiple winch and wire systems have been proposed in an effort to mitigate the problems of using A&R wires. An example is disclosed in U.S. Pat. No. 7,507,055, assigned to Subsea 7 Ltd. This recognises that A&R operations do not always take place at extremes of depth and that those operations can be handled more conveniently, where possible, with a smaller-capacity wire and winch than with a larger-capacity wire and winch. Consequently, pipelaying vessels are often equipped with both larger-capacity and smaller-capacity wires and winches.

These differently-rated wires and winches may be used together or successively. For example, when abandoning a pipeline, the larger-capacity wire and winch may be used to lower the pipeline end to an intermediate depth at which the top tension reduces to an extent that the load can be transferred to the smaller-capacity wire and winch. The higher-capacity wire can then be disconnected from the pipeline end and retracted to the pipelaying vessel. The smaller-capacity wire and winch then takes over to lower the pipeline end the rest of the way to the seabed. This means that a shorter length of larger-diameter wire is required on the drum of the higher-capacity winch, reducing space requirements and potentially also cost. However each wire remains vulnerable to damage and if spares are kept on board for both wires, the pipelaying vessel must accommodate four wires and not just two. This consumes space and reduces any cost advantage.

It has been proposed to use complete single lengths of synthetic rope with traction winches for A&R purposes but that is not yet a proven technology. It is also noted that any damage to any part of a continuous rope may lead to the entire rope being down-rated or rejected, like a wire.

It is against this background that the present invention has been devised.

BRIEF SUMMARY OF THE INVENTION

In one sense, the invention resides in a sling section cooperable with like sling sections to form a sling for use in abandonment or recovery of a pipeline, the sling section being elongate to define opposed ends, and comprising: a first end-piece at one end of the sling section; and a second end-piece at the opposite end of the sling section. The sling section further comprises: complementary connector formations associated with each respective end-piece, each connector formation being cooperable, in use when forming a sling, with a complementary connector formation of a neighbouring like sling section in the sling; a tensile load-bearing sling element extending between the end-pieces; and a sleeve around the sling element.

For use in the context of a J-lay operation, it is much preferred that the sling section is capable of being handled by pipe-joint handling apparatus associated with a J-lay tower. To this end, advantageously, the sleeve is more resistant to bending than the sling element, and is preferably torsionally stiffer than the sling element.

The sleeve suitably extends between, and is supported by, the end-pieces, and at least part of an end-piece may extend into an end of the sleeve. Preferably, the sleeve is movable longitudinally with respect to at least one of the end-pieces to accommodate extension or contraction of the sling element in use.

In the embodiments to be described, the sleeve is spaced from the sling element. In that case, the sling section preferably comprises a port for admitting water to the space between the sleeve and the sling element when the sling section is submerged in use. To reduce degradation of the sling section due to exposure to abrasives such as sand, the port suitably has a filter for filtering debris from water entering the space through the port.

The sling element suitably extends along a central longitudinal axis of the sling section, and is preferably coaxial with the sleeve in cross-section. For light weight and high strength, the sling element may for example be made of carbon or aramid composites, or polyethylene.

The sling element preferably terminates in anchor parts at each end, the anchor parts being cooperable with the end-pieces; for example, each anchor part may be received in a respective cup of an end-piece. The anchor parts may be flexibly attached to the end-pieces, for example by being pivotably attached to the end-pieces.

To avoid twisting of the sling element in use, it is preferred that the end pieces engage with the sleeve to resist relative angular movement between the end pieces and the sleeve around the central longitudinal axis of the sling section. For example, a pin that secures the anchor part to an end piece may extend beyond the diameter of the end piece to engage with opposed formations such as holes or slots in the sleeve.

Advantageously, at least one of the end-pieces has external formations cooperable with a tensioner for applying tension to the sling when a plurality of the sling sections are assembled end-to-end to form the sling.

The inventive concept encompasses a sling comprising a plurality of sling elements in accordance with the invention.

The sling elements of the invention enable, and the inventive concept embraces, methods of abandoning and recovering a pipeline during subsea pipelaying.

One such method is a method of abandoning a pipeline during subsea pipelaying, the method comprising attaching a connector to a pipeline end, releasably engaging a sling section to the connector to start creating a sling and, in succession, releasably engaging a plurality of like sling sections to an upper end of the sling while lowering the pipeline end into the sea. Preferably, the sling sections are releasably engaged to the upper end of the sling in a J-lay tower that launches the sling into the sea.

Another such method is a method of recovering a pipeline during subsea pipelaying, the method comprising raising the pipeline end using a sling made up of successive sling sections releasably engaged to each other in end-to-end relation, while successively disengaging sling sections from an upper end of the sling. Preferably, the sling sections are disengaged from an upper end of the sling in a J-lay tower that lifts the sling from the sea.

Thus, preferred embodiments of the invention employ sections of substantially non-metallic sling elements encased in a buoyant or near-buoyant non-metallic sleeve fitted with a means of quick connection on each end. The assembly is handled much as a conventional pipe would be in a J-lay system, and as a result handling time is minimised.

The sling element and the sleeve are preferably of synthetic polymers designed to be as near neutrally buoyant as possible in water: this means that the top tension will reduce with each section launched. The outcome of this is that the sling of the invention need not be deployed all the way to the seabed: deployment may be limited to the depth that more conventional (and faster) wire A&R systems can take over. As top tension will have reduced substantially by that stage, a relatively low-capacity winch and wire can be used that is more compact, less expensive and more convenient than the higher-capacity winch and wire that would otherwise be necessary to handle A&R duties.

Light weight is beneficial for the sling sections of the present invention as this reduces top tension as the sling is progressively abandoned and the pipeline end is lowered. However, neutral buoyancy or slightly negative buoyancy is preferred to positive buoyancy for the sling sections. Whilst positive buoyancy would be good for reducing top tension, it may present challenges in controlling the sling once a load has been released from it.

Another advantage of the invention is that if a section of sling is damaged, only that one section need be rejected and replaced with another section at reduced cost. The cost of emergency spares carried on board the pipelaying vessel is also reduced.

DESCRIPTION OF THE DRAWINGS

Reference has already been made to FIGS. 1 and 2 of the accompanying drawings to put the invention into context. In order that the invention may be more readily understood, reference will now be made, by way of example, to the drawings in which.

DETAILED DESCRIPTION OF THE INVENTION

Figure 1:
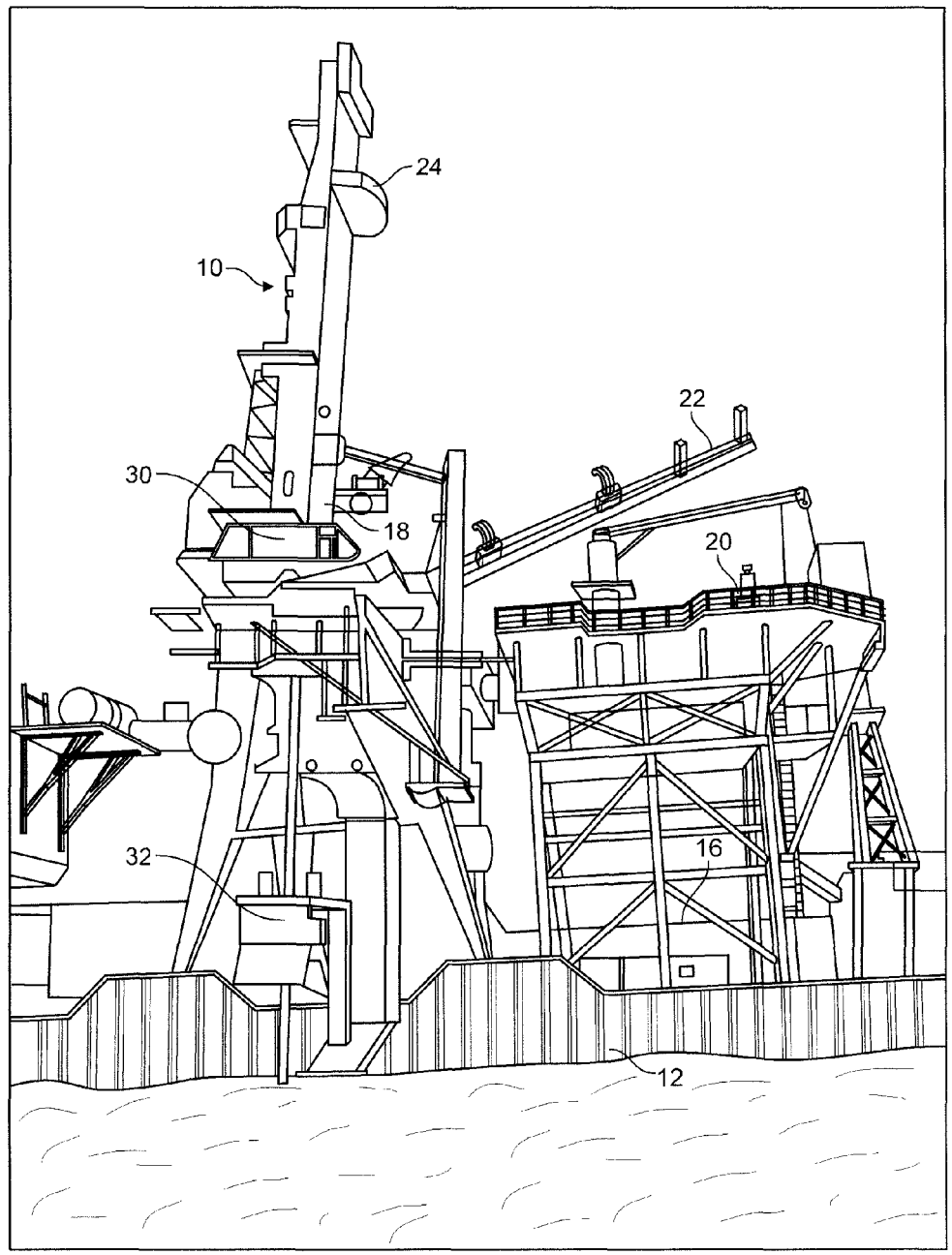
FIG. 1 is a side view of a J-Lay tower on a barge.
Figure 2:
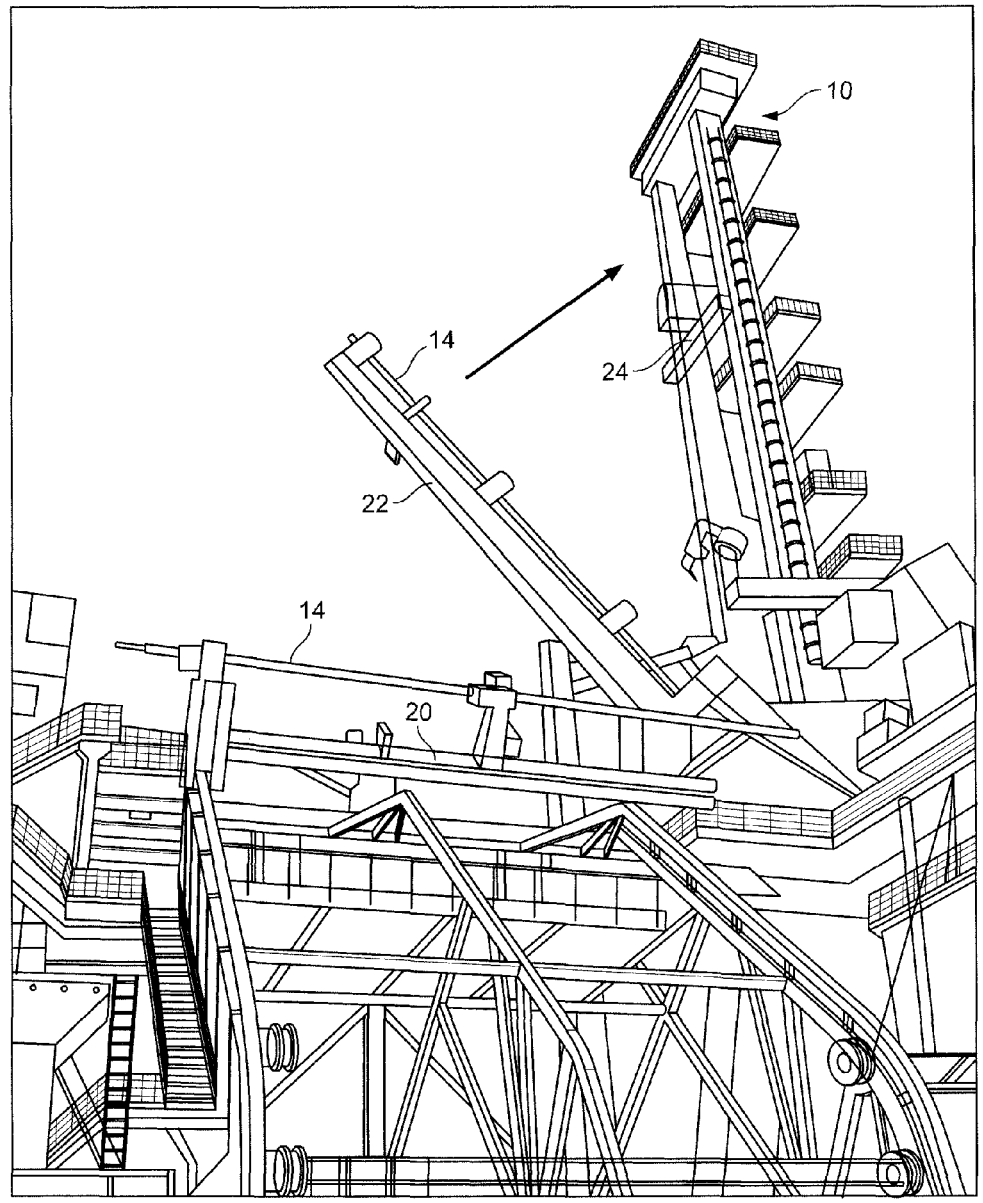
FIG. 2 is a perspective view of an erector arm loading a double joint into the tower of FIG. 1.
Figure 3:
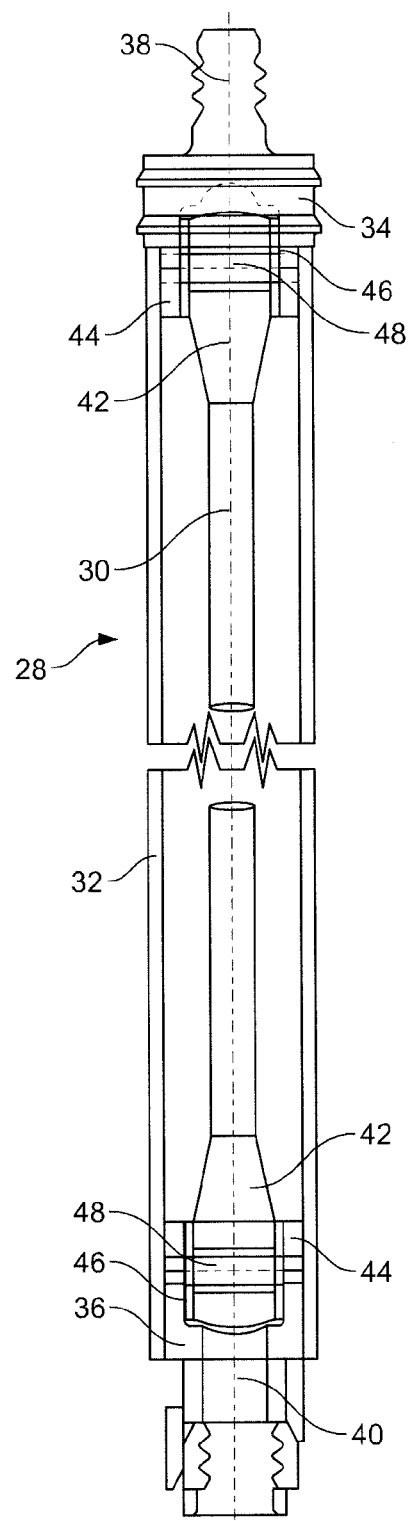
FIG. 3 is a sectional side view of a sling section in accordance with the present invention.

Referring specifically now to FIG. 3, a sling section 28 in accordance with the invention comprises four main components, namely:

- a sling element 30, being a tensile member extending along the central longitudinal axis of the sling section 28;
- a circular-section tubular sleeve 32 surrounding the sling element 30 and extending along its length, being concentric with and spaced from the sling element 30; and
- two opposed end-pieces 34, 36 that extend into, and cap, respective ends of the sleeve 32 and that anchor the respective opposed ends of the sling element 30.

Figure 4:
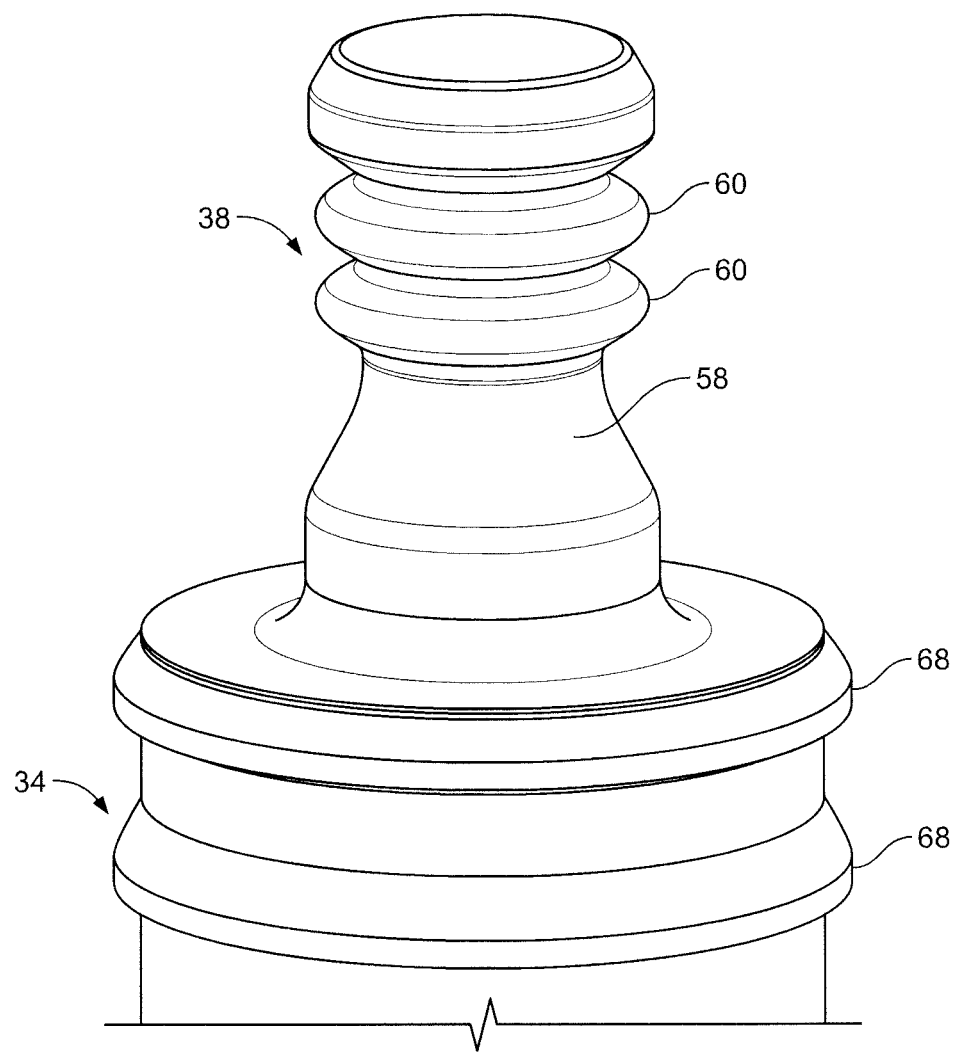
FIG. 4 is a perspective view of a male connector at one end of the sling section shown in FIG. 3.
Figure 5A:
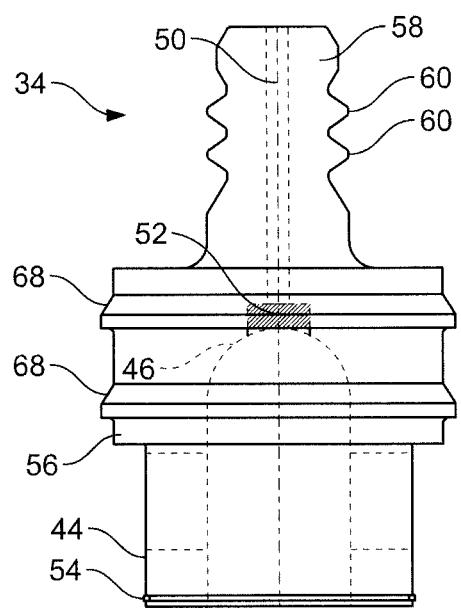
FIGS. 5(a) and 5(b) are side sectional views of end pieces having, respectively, male and female connectors showing additional details including flooding, filtering and sealing arrangements.
Figure 5B:
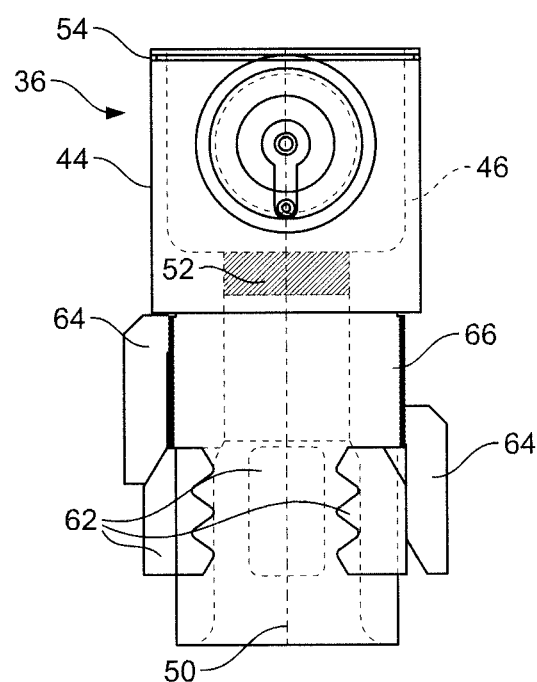

One end-piece of the sling section 28 comprises a male connector 38, shown externally in FIG. 4 and in cross-sectional detail in FIG. 5(a), and the other end-piece comprises a complementary female connector 40, shown in cross-sectional detail in FIG. 5(b), for receiving the male connector 38 of an identical neighbouring sling section 28. The connectors 38, 40 cooperate with a quick action, in a manner best appreciated with reference to FIG. 6.

The sling section 28 emulates the length, diameter and circular cross-section of a conventional pipe joint used in a J-lay system. For the purposes of this specification, 'pipe joint' may be taken to include longer pipe sections such as double joints and quad joints.

Thus being, in effect, a pipe joint analogue, the sling section 28 can be handled on a pipelaying vessel in much the same way as a pipe joint would be. The sling section 28 can therefore be lifted from storage on the deck of the vessel into the J-lay tower, and from there it can be engaged to a preceding sling section 28 by means of the quick-action connectors 38, 40. This minimises handling time and speeds the abandonment process, noting that abandonment should be performed as quickly as possible—especially in the event that bad weather is approaching.

Similarly, recovery involves the reverse operation of disengaging and separating each sling section 28 from the sling section 28 below as the sling is raised from the water via the J-lay tower. Again, saving time is important during recovery as it allows the vessel to resume pipelaying as quickly as possible.

The sleeve 32 is an extruded polymer pipe, for example of high-density polyethylene with a typical wall thickness of 60 mm. The sleeve 32 does not merely emulate a pipe joint: it also helps to protect the sling element 30 from abrasion and other mechanical damage and also from UV degradation during use, especially during handling and when lying on the deck of the pipelaying vessel awaiting use. The sleeve 32 also creates a protective barrier around the sling element 30 when underwater.

The sling section 28 will typically be rated for a top tension of 750 tons with a safety factor of three.

The sling element 30 forming the load-bearing core of the sling section 28 is of a lightweight, high-strength synthetic material such as aramid- or carbon-fibre composites, or ultra-high molecular weight polyethylene (UHMWPE) sold, for example, under the trade mark Dyneema. Aramid composites, sold for example under the trade mark Kevlar, are currently preferred for their low creep characteristics and slightly negative buoyancy.

Each end of the sling element 30 is attached to a respective enlarged anchor part 42 that cooperates with a respective one of the end-pieces. The anchor parts 42 and the end-pieces 34, 36 should be as light as possible and may be made of, for example, titanium, carbon-fibre composites or stainless steel.

Referring now also to FIGS. 5(a) and 5(b), each end-piece 34, 36 of the sling section 28 has a hollow plug part 44 of skirt-like circular-section that fits closely within a respective end of the sleeve 32. The plug part 44 of each end-piece 34, 36 is hollow by virtue of an inwardly-facing cup 46 that receives a respective one of the anchor parts 42 of the sling element 30, as shown in FIG. 3.

A transverse bore transects each end-piece in alignment with a bore extending through the anchor part 42 received in the cup 46, such that a pin 48 extending through the aligned bores fixes the anchor part 42 in the cup 46. The pin attachment lends a degree of flexibility to the connection between the anchor part 42 and the associated end-piece 34, 36. This enhances the flexibility of a sling made up of many such sections 28.

The space between the sling element 30 and the sleeve 32 must be allowed to flood to equalise pressure as the sling submerges. Water must therefore be free to enter and air must be free to escape from that space. For this purpose, each end-piece 34, 36 has a port 50 that communicates between the space and the exterior of the sling section 28. That port 50 extends from the cup 46 outwardly through the remainder of the end-piece 34, 36 along the central longitudinal axis of the sling section 28.

A filter 52 extends across each port 50 at the base of the cup 46. The purpose of the filter 52 is to keep sand and other debris out of the space between the sling element 30 and the sleeve 32. Otherwise, abrasives such as sand could enter the matrix of the sling element 30 and hence damage and degrade the sling element 30 over time. For the same reason, a dirt seal 54 extends circumferentially around the plug part 44 of each end-piece 34, 36 near its inner end, to seal against the inner wall of the sleeve 32.

The end-piece 34 with the male connector 38 has a shoulder 56 that bears against its end of the sleeve 32 when the plug part 44 of that end-piece 34 is fully inserted into the sleeve 32. Conversely, the inner part of the end-piece 36 with the female connector 40 has no corresponding shoulder and is a sliding fit within its end of the sleeve 32. In this way, the female connector 40 can move in or out with respect to the sleeve 32 as the length of the sling element 30 varies slightly with creep or elastic deformation under varying loads in use.

The male and female connectors 38, 40 operate in a manner akin to the 'H-4' subsea connectors known for many years in the offshore industry. Such connectors are supplied, for example, by the GE business VetcoGray.

As FIGS. 3, 4 and 5(a) show, the male connector 38 comprises a stud 58 of circular cross section extending along the central longitudinal axis of the sling section 28. That stud 58 is encircled by spaced circumferential ridges 60 lying in planes perpendicular to the central longitudinal axis.

FIGS. 3 and 5(b) show that the female connector 40 has a recess that lies on the central longitudinal axis of the sling section 28 and is complementary to the stud 58 of the male connector 38. Locking dogs 62 with ridged formations complementary to the ridges of the stud 58 are spaced equi-angularly around the recess. The locking dogs 62 are movable radially in response to axial movement of a locking collar 64. The locking collar 64 is turned around an external thread 66 on the female connector 40 to interact in cam-like manner with the locking dogs 62 to lock and release the coupling as required.

Figure 6:
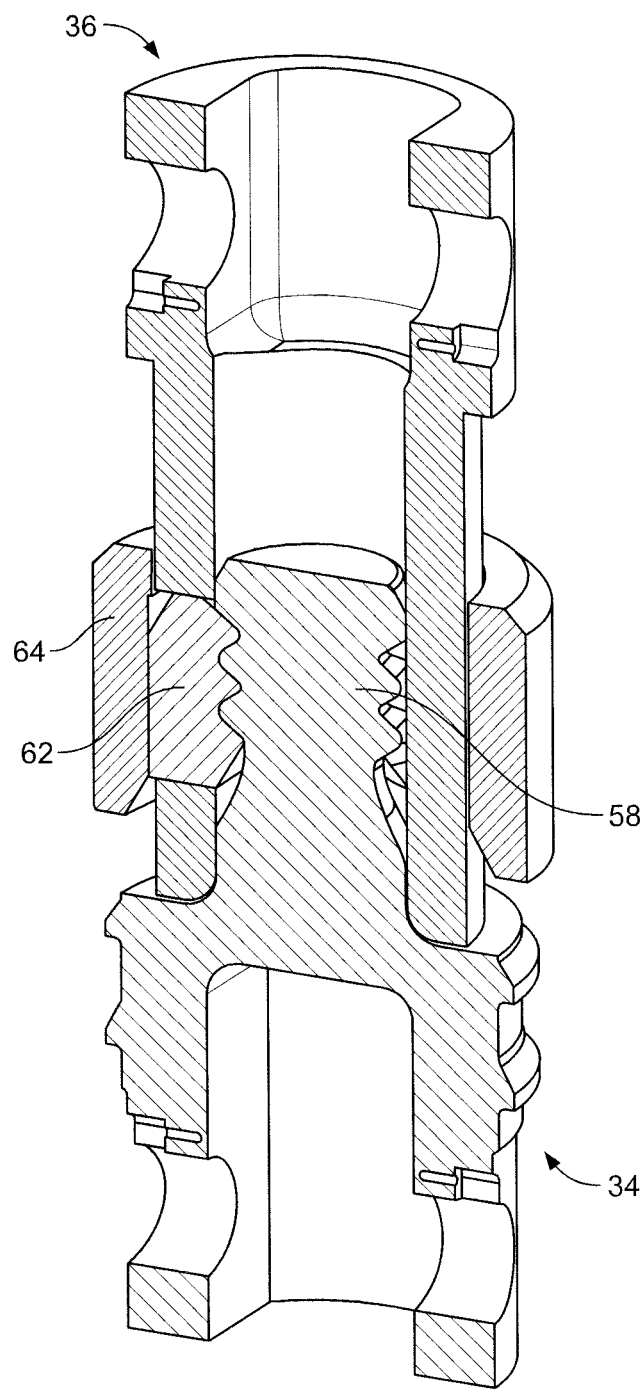
FIG. 6 is a sectional perspective view showing how the male connector shown in FIGS. 3, 4 and 5(a) is received within and secured to a complementary female connector shown in FIG. 5(b) at the adjoining opposite end of an identical neighbouring sling section.

FIG. 6 shows that when fully inserted into the corresponding recess of the female connector 40 of a neighbouring sling section 28, the stud 58 is engaged by the locking dogs 62 that move radially inwardly as the locking collar 64 is advanced along its thread 66, to lock the stud 58 against axial movement.

The circular cross-sections of the stud 58 and the corresponding recess allow for relative pivotal movement of neighbouring sling sections 28 around their common central longitudinal axis. The resulting ability for the sling, as a whole, to twist enhances the flexibility of a sling made up of many such sling sections 38.

Further circumferential ridges encircle 68 the end-piece with the male connector 38, those ridges serving as upper and lower collar supports. The ridges 68 are accessible to a tensioner of a J-lay tower when the sling is assembled, to enable tension to be applied to the sling section 28—and hence to a sling made up of such sections—without damaging the sleeve 32.

In summary:
the sling element 30 is the load-bearing part of the sling section 28;
the sleeve 32 allows efficient handling of the sling section 28 and helps to protect the sling element 30; and
the end-pieces 34, 36 with connectors 38, 40 at each end of the sling section 28 allow fast interconnection to neighbouring sling sections 28 and the application of tension to a sling made up of several such sections.

Figure 7A:
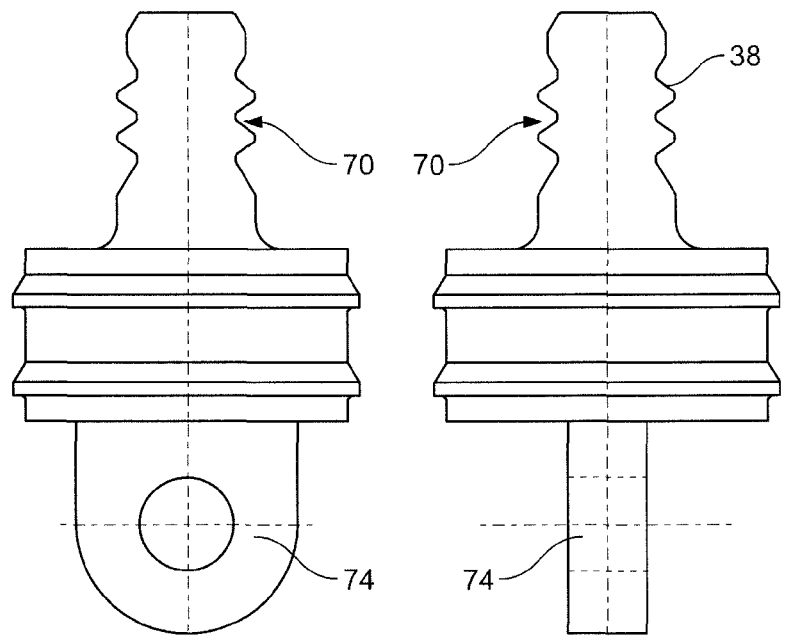
FIGS. 7(a) and 7(b) are side sectional views of, respectively, variants of the male and female connectors shown in FIGS. 5(a) and 5(b), those variants being for use connecting an end of the sling to other objects such as a wire that suspends the sling or to a load such as a PLET suspended by the sling.
Figure 7B:
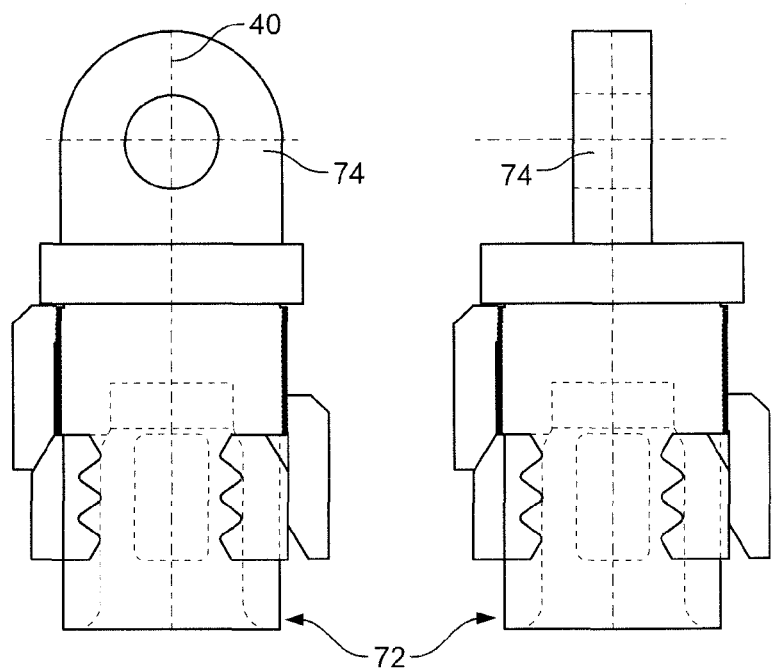

FIGS. 7(a) and 7(b) show connectors 70, 72 to be used for connecting other objects to the terminal sling sections 28 of the sling. Examples of such objects are a wire that suspends the sling or a shackle for attachment to a load such as a PLET suspended by the sling.

The connectors 70, 72 shown in FIGS. 7(a) and 7(b) have, respectively, male and female connector formations 38, 40 that are complementary to, and that operate in the same manner as, the male and female connectors 38, 40 of the end-pieces 34, 36 described above. However a padeye formation 74 replaces the plug parts 44 of those end-pieces 34, 36. This padeye formation 74 enables attachment of the connectors 70 to such other objects as may be necessary. The connector 70, 72 can then be attached quickly and easily to a male or female connector 38, 40 at an end of the sling as appropriate.

Figure 8:
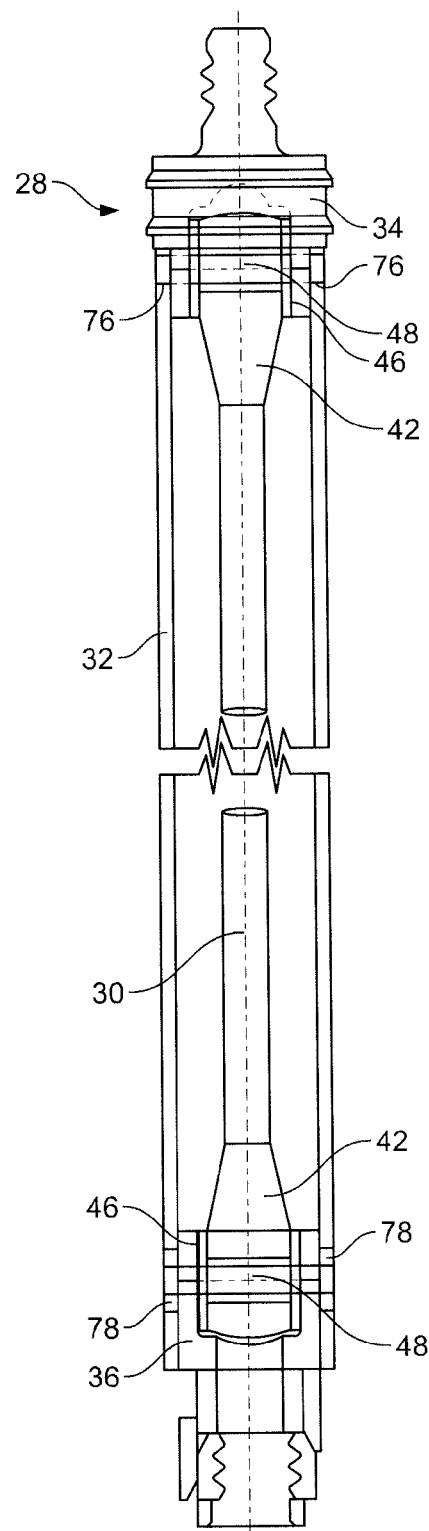
FIG. 8 is a sectional side view corresponding to FIG. 3, in which there are modifications to the end pieces and the sleeve shown in that Figure.

FIG. 8 shows a variant of the sling section 28 of FIG. 3, in which the end-pieces 34, 36 and the sleeve 32 are modified. The modification engages the end-pieces 34, 36 with the sleeve 32 to resist relative angular movement around the central longitudinal axis of the sling section 28. Such movement could otherwise occur due to torsional stresses that may arise in the sling in use; if that happens, the sling elements 30 of the sling sections 28 could twist undesirably.

In the variant shown in FIG. 8, the end-pieces 34, 36 engage with the sleeve 32 because the pins 48 that secure the anchor parts 42 of the sling element 30 in the cups 46 extend beyond the diameter of the respective plug parts 44. The protruding ends of the pins 48 engage in opposed holes 76 or slots 78 extending through the wall of the sleeve 32. Holes 76 extend through the wall of the sleeve 32 near its end having the male connector 38 whereas longitudinally-extending slots 78 extend through the wall of the sleeve 32 near its end having the female connector 40. These slots 78 allow the end-piece 36 with the female connector 40 to move longitudinally with respect to the sleeve 32 for the reasons explained previously, while preventing angular movement around the central longitudinal axis of the sling section 28. The end-piece 34 with the male connector 38 has no provision to move in the same manner, hence the use of holes 76 instead of slots 78 at that end of the sleeve 32.

Moving on finally now to FIGS. 9(a) to 10(c), these schematic drawings show how the sling sections 28 of the invention can be used in abandonment and recovery procedures. Details such as the use of a recovery buoy have been omitted for clarity.

Figure 9A:
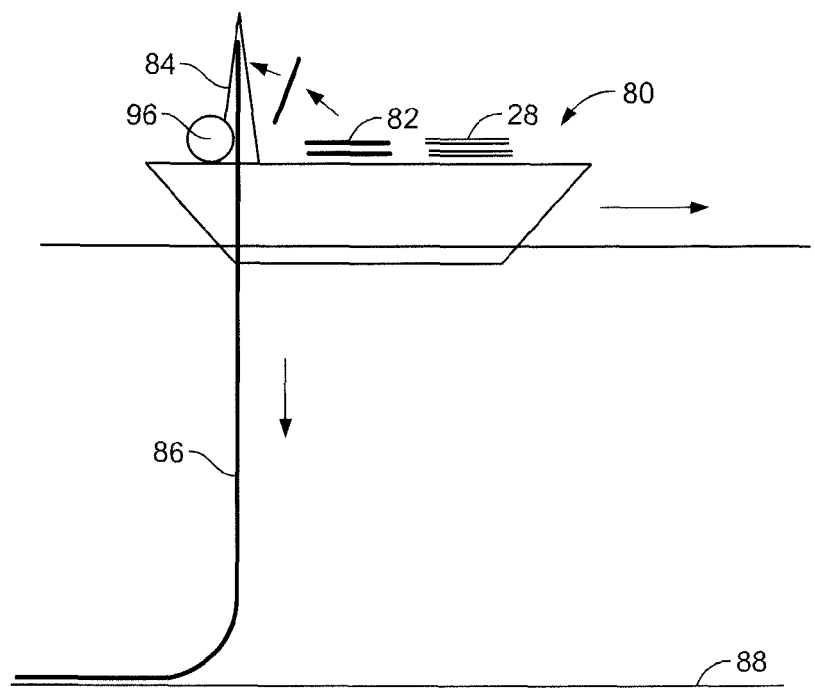
FIGS. 9(a) to 9(d) are schematic views showing some steps involved in an abandonment procedure employing the sling sections of the invention.

FIG. 9(a) shows a pipelaying vessel 80 advancing along a pipeline path during pipelaying. The vessel 80 is laying a pipeline in deep water using the J-lay method, taking pipe joints 82 from the deck, welding them successively to a pipeline end in a J-lay tower 84 and launching the resulting pipe string 86 downwardly into the sea. The pipe string 86 hangs as a catenary between the vessel 80 and the seabed 88.

Figure 9B:
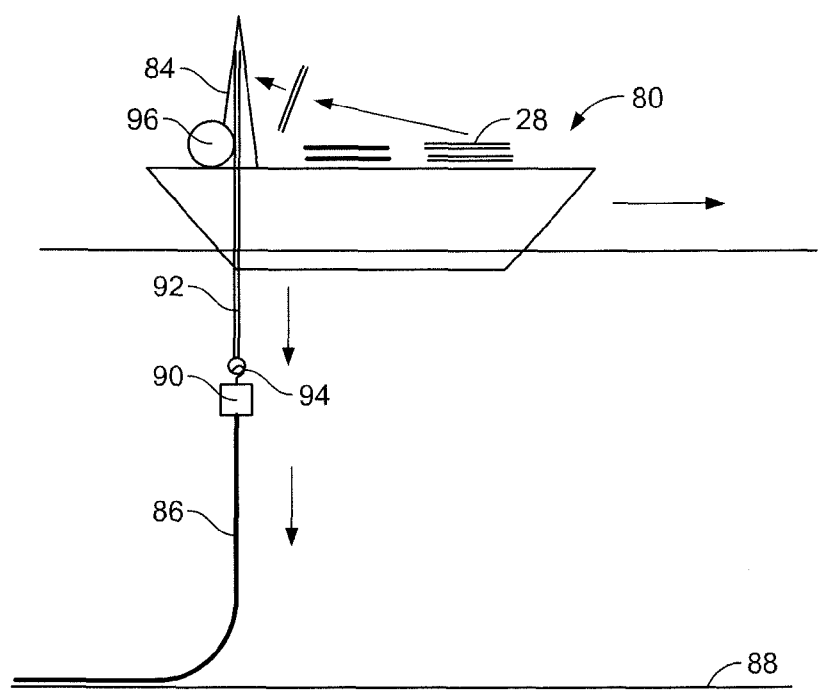

In FIG. 9(b), an abandonment procedure is underway. A PLET 90 has been attached to the pipeline end and is suspended by a sling 92 made up of sling sections 28, taken successively from storage on the deck of the vessel 80 and attached to each other end-to-end in the J-lay tower 84 before launching. The PLET 90 is attached to the sling 92 by a shackle 94 that may be attached to the bottom end of the sling 92 via a connector 70, 72 that is not shown in these figures but is as shown in FIG. 7(a) or 7(b). The vessel 80 continues to advance along the pipeline path as abandonment proceeds.

Figure 9C:
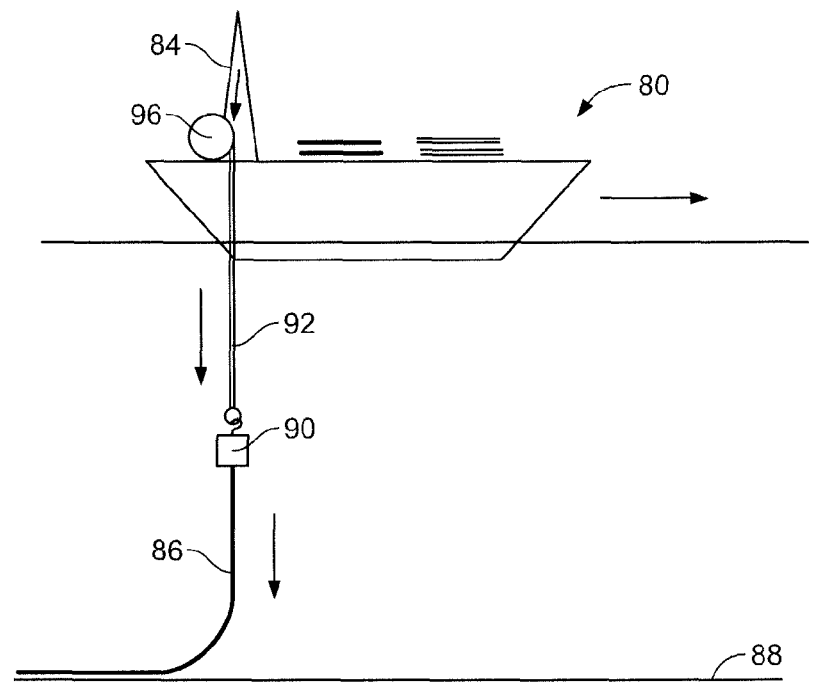

FIG. 9(c) shows the PLET 90 and pipeline end lowered to an intermediate depth at which a low-capacity winch 96 and wire 98 can take over abandonment duties. Hence, tension in the sling 92 and the pipe string 86 below has been being transferred from the tensioner of the J-lay tower 84 to the winch 96 on the vessel 80, which lowers the PLET 90 and pipeline end to the seabed 88. The vessel 80 continue to advance along the pipeline path as abandonment proceeds.

Figure 9D:
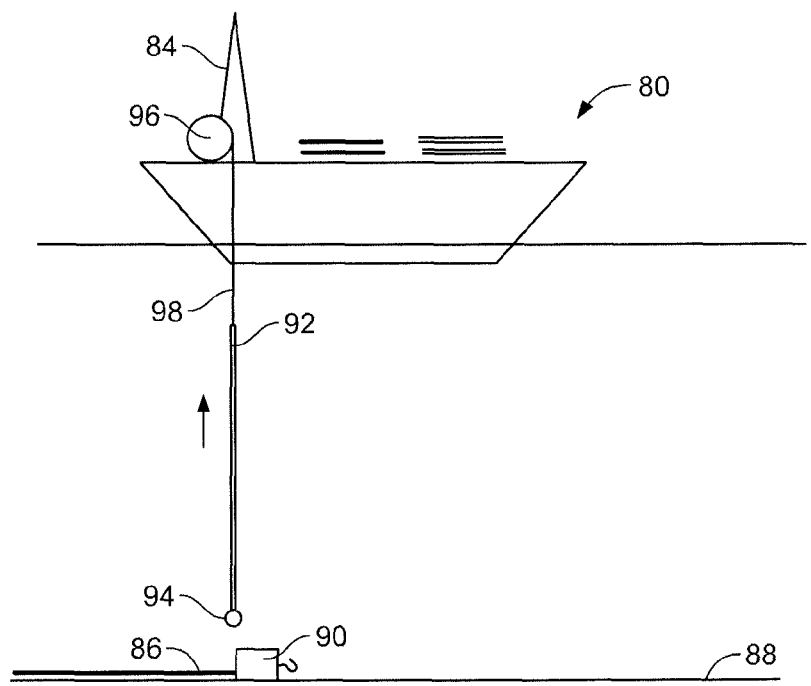

FIG. 9(d) shows the situation immediately after the PLET 90 and the pipeline end have been laid on the seabed. The vessel has stopped and has used an ROV (not shown) or other known technique to disengage the sling 92 from the PLET 90.

The sling 92 is now being raised by the winch 96 and wire 98. The vessel 80 may then depart, to return when it is able to resume pipelaying.

Figure 10A:
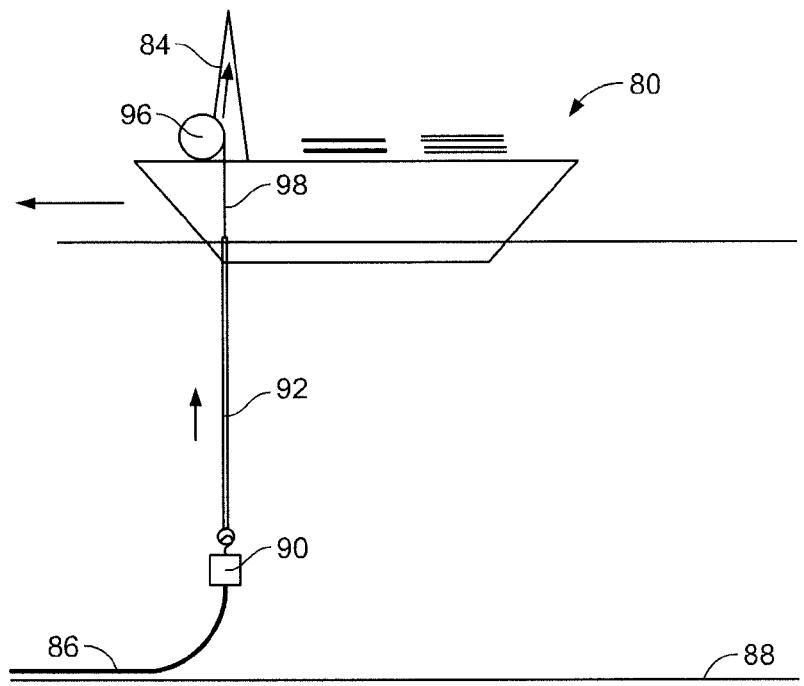
FIGS. 10(a) to 10(c) are schematic views showing some steps involved in a recovery procedure employing the sling sections of the invention.

In FIG. 10(a), the vessel 80 has returned and located the PLET 90, and a recovery procedure is underway. Here, a sling 92 has been assembled from sling sections 28 in the J-lay tower 84 in the manner described above, lowered to the seabed 88 by the winch, and engaged to the PLET 90. The PLET 90 and pipeline end are being raised by the winch to an intermediate depth within the capacity of the winch 96 and its wire 98. The vessel 80 will move as necessary to prevent unnecessary stress on the pipe string 86 while it is being raised.

Figure 10B:
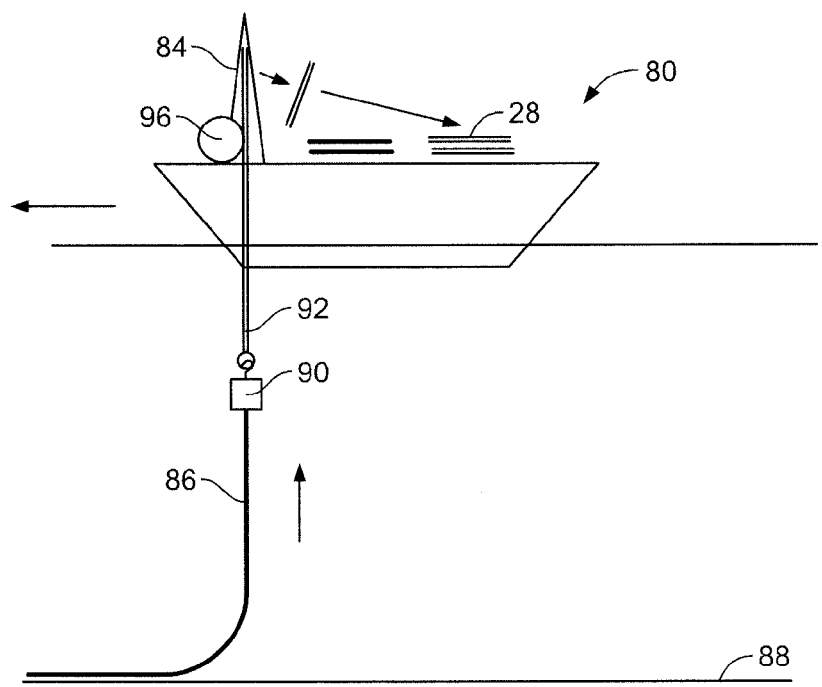

Before the winch 96 and wire 98 reach their safe limit, the upper end of the sling 92 reaches the vessel 80 and the tension of the pipe string 86 is transferred from the winch 96 to the J-lay tower 84. This situation is shown in FIG. 10(b). The sling 92 then carries the increasing load as the PLET 90 and pipeline end near the surface. As the sling 92 is progressively recovered from the water, sling sections 28 are disengaged from the top of the sling 92 in the J-lay tower 84 and returned to storage on the deck of the vessel 80 as shown for re-use.

Figure 10C:
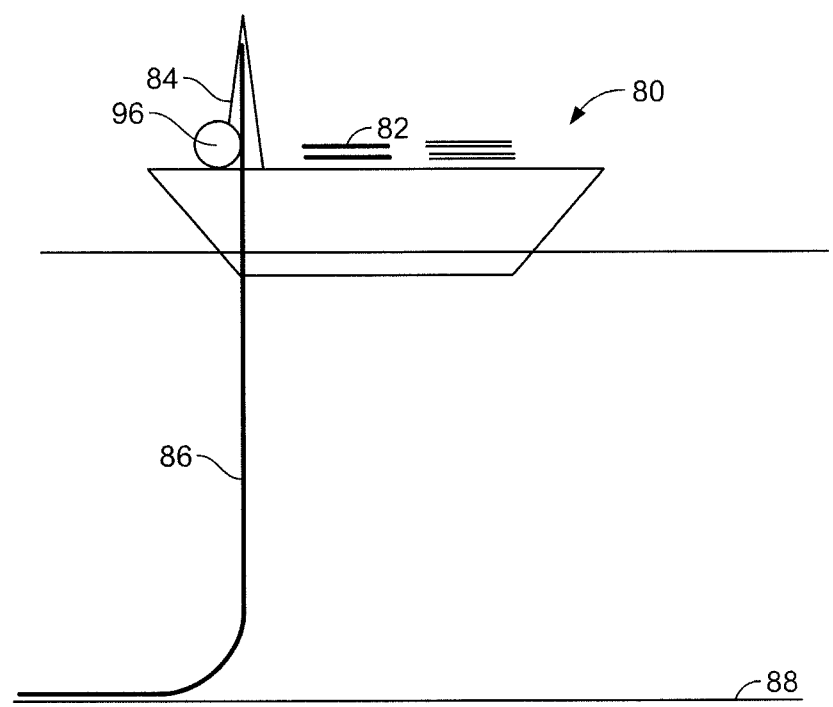

Finally FIG. 10(c) shows the PLET 90 removed from the pipe string 86, which is now supported once more by the tensioner of the J-lay tower 84 ready for pipelaying to resume as shown in FIG. 9(a).

Many variations are possible within the inventive concept. For example, a sling made up of the sling sections of the invention could be used to abandon and recover a pipeline all the way to and from the seabed. Also, material selections and details such as port and filter arrangements may be varied without departing from the inventive concept.

The invention claimed is:

1. A sling section cooperable with like sling sections to form a sling for use in abandonment or recovery of a pipeline, the sling section being elongate to define opposed ends, and comprising:
    a first end-piece at one end of the sling section; and
    a second end-piece at the opposite end of the sling section;
wherein the sling section further comprises:
    complementary connector formations associated with each respective end-piece, each connector formation being cooperable, in use when forming the sling, with a complementary connector formation of a neighboring like sling section in the sling;
    a tensile load-bearing sling element extending between the end-pieces; and
    a sleeve around the sling element.

2. The sling section of claim 1, wherein the sling section is capable of being handled by pipe-joint handling apparatus associated with a J-lay tower.

3. The sling section of claim 1 wherein the sleeve extends between, and is supported by, the end-pieces.

4. The sling section of claim 3, wherein the sleeve is movable longitudinally with respect to at least one of the end-pieces.

5. The sling section of claim 1, wherein at least part of an end-piece extends into an end of the sleeve.

6. The sling section of claim 1, wherein the sleeve is spaced from the sling element.

7. The sling section of claim 1, wherein the sleeve is more resistant to bending than the sling element.

8. The sling section of claim 1, wherein the sleeve is torsionally stiffer than the sling element.

9. The sling section of claim 1, further comprising a port for admitting water to the space between the sleeve and the sling element when the sling section is submerged in use.

10. The sling section of claim 9, wherein the port has a filter for filtering debris from water entering the space through the port.

11. The sling section of claim 1, wherein the sling element extends along a central longitudinal axis of the sling section.

12. The sling section of claim 11, wherein the sleeve is coaxial with the sleeve in cross-section.

13. The sling section of claim 1, wherein the sling element is of carbon or aramid composites, or polyethylene.

14. The sling section of claim 1, wherein the sling element terminates in anchor parts at each end, the anchor parts being cooperable with the end-pieces.

15. The sling section of claim 14, wherein each anchor part is received in a respective cup of an end-piece.

16. The sling section of claim 14, wherein the anchor parts are flexibly attached to the end-pieces.

17. The sling section of claim 16, wherein the anchor parts are pivotably attached to the end-pieces.

18. The sling section of claim 1, wherein at least one end piece engages with the sleeve to resist relative angular movement between the end piece and the sleeve around the central longitudinal axis of the sling section.

19. The sling section of claim 18, wherein the sling element terminates in anchor parts at each end, the anchor parts being cooperable with the end-pieces, and a pin that secures each anchor part to the end piece extends beyond the diameter of the end piece to engage with opposed formations in the sleeve.

20. The sling section of claim 1, wherein at least one of the end-pieces has external formations cooperable with a tensioner for applying tension to the sling when a plurality of the sling sections are assembled end-to-end to form the sling.

21. A sling comprising a plurality of cooperating sling sections, wherein each sling section is elongate to define opposed ends and comprises:
    a first end-piece at one end of the sling section; and
    a second end-piece at the opposite end of the sling section;
    connector formations associated with respective end-pieces, each connector formation being cooperable, in use when forming the sling, with a complementary connector formation of a neighboring like sling section in the sling;
    a tensile load-bearing sling element extending between the end-pieces; and
    a sleeve around the sling element.

22. A method of abandoning a pipeline during subsea pipelaying, the method comprising:
    attaching a connector to a pipeline end;
    releasably engaging a sling section to the connector to start creating a sling, wherein the sling section is elongate to define opposed ends and comprises:
        a first end-piece at one end of the sling section;
        a second end-piece at the opposite end of the sling section;
        a tensile load-bearing sling element extending between the end-pieces; and
        a sleeve around the sling element;
    and, in succession, releasably engaging a plurality of like sling sections to an upper end of the sling while lowering the pipeline end into the sea.

23. The method of claim 22, wherein the sling sections are releasably engaged to the upper end of the sling in a J-lay tower that launches the sling into the sea.

24. A method of recovering a pipeline during subsea pipelaying, the method comprising raising a pipeline end using a sling made up of successive sling sections releasably engaged to each other in end-to-end relation, while successively disengaging sling sections from an upper end of the sling, wherein each sling section is elongate to define opposed ends and comprises:
- a first end-piece at one end of the sling section;
- a second end-piece at the opposite end of the sling section;
- a tensile load-bearing sling element extending between the end-pieces; and
- a sleeve around the sling element.

25. The method of claim 24, wherein the sling sections are disengaged from an upper end of the sling in a J-lay tower that lifts the sling from the sea.

* * * * *